United States Patent
Chung

(10) Patent No.: US 8,205,095 B2
(45) Date of Patent: Jun. 19, 2012

(54) METHOD AND SYSTEM FOR REMOTELY DEBUGGING A FAILED COMPUTER MACHINE

(75) Inventor: Chien-Chung Chung, Taipei (TW)

(73) Assignee: NVIDIA Corporation, Santa Clara, CA (US)

( * ) Notice: Subject to any disclaimer, the term of this patent is extended or adjusted under 35 U.S.C. 154(b) by 1067 days.

(21) Appl. No.: 11/934,690

(22) Filed: Nov. 2, 2007

(65) Prior Publication Data

US 2009/0119513 A1    May 7, 2009

(51) Int. Cl.
*G06F 11/30* (2006.01)
(52) U.S. Cl. ....... 713/187; 713/193
(58) Field of Classification Search ........ 713/187, 713/193
See application file for complete search history.

(56) References Cited

U.S. PATENT DOCUMENTS

| | | | |
|---|---|---|---|
| 7,418,593 B2 * | 8/2008 | Paatero et al. | 713/166 |
| 7,748,033 B2 * | 6/2010 | Nita et al. | 726/11 |
| 2003/0093685 A1 * | 5/2003 | Tobin | 713/200 |
| 2004/0181682 A1 * | 9/2004 | Orino et al. | 713/200 |
| 2004/0255199 A1 * | 12/2004 | Yamashita | 714/37 |
| 2006/0195894 A1 | 8/2006 | Nita et al. | |

OTHER PUBLICATIONS

Office Action, corresponding TW Application No. 097104001 dated Sep. 21, 2011.

* cited by examiner

*Primary Examiner* — Peter Poltorak
*Assistant Examiner* — Amare F Tabor
(74) *Attorney, Agent, or Firm* — Patterson & Sheridan, LLP

(57) ABSTRACT

A method for conducting a remote debugging session comprises setting a secure connection link with a failed client machine, receiving status information from the client machine through the connection link in response to a debug instruction sent to the client machine, displaying the status information in a readable form, requesting a user to enter a cryptographic key in response to a request for saving the status information, and generating a secured file containing the status information encrypted with the cryptographic key.

11 Claims, 4 Drawing Sheets

METHOD AND SYSTEM FOR REMOTELY DEBUGGING A FAILED COMPUTER MACHINE

BACKGROUND OF THE INVENTION

1. Field of the Invention

The present invention generally relates to remote debugging of failed computer machines, and more particularly to methods and systems for remotely debugging a failed computer machine with improved protection of information generated during the debug session.

2. Description of the Related Art

Unless otherwise indicated herein, the approaches described in this section are not prior art to the claims in this application and are not admitted to be prior art by inclusion in this section.

To service a malfunctioning client computer (also called "client machine" hereafter), debug tools have been recently developed to facilitate checking and correction operations performed on the processing chip or chipset of the failed client machine.

To illustrate, FIG. 1 is a simplified diagram of a conventional implementation for debugging a malfunctioning client machine. The debug tool includes a software-implemented debug application 102 installed in a host computer, also called "debugger machine" 104, which is coupled to a failed client machine 106 to debug via a connection link 108. The connection link 108 between the debugger machine 104 and the client machine 106 may be achieved via a direct test access port such as the JTAG interface developed by the Joint Test Action Group ("JTAG"), or remotely through a network connection such as a Local Area Network ("LAN") or Internet connection. As the debug session proceeds, the debug application 102 may issue debug instructions to the client machine 106. Consequently, the client machine 106 may send certain status information back to the debugger machine 104 to generate debug files 110 for analysis. Because the transmitted information includes sensitive information about the internal configuration of the client machine 106, such as the configuration of chip registers, protection measures are required to make sure that they are only accessible to authorized users.

Currently, one implemented protection measure includes the request of a confidential key or password to the service engineer before the debug session starts. The debug session will be initiated only when a valid key is inputted by the service engineer. When the client machine 106 and the debugger machine 104 are coupled through a network connection, additional protections using encryption by digital signatures may also be applied on the packets of information transmitted via the connection link 108 to prevent interception from a rogue agent. As they are received by the debugger machine 104, the packets of information sent from the client machine 106 are assembled to generate a debug file 110 that can then be visualized on the debug application 102.

While the aforementioned implementation provides some degree of protection for sensitive information exchanged during the debug session, loopholes may still exist. For example, after the debug file 110 is assembled, the user usually needs to save the debug file 110 in a storage medium (not shown) before further analysis works are performed on its content. As a result, it is still possible for an unauthorized user who has access to the storage medium to copy and read the content of the debug file 110. Because the debug file 110 may contain sensitive information, it is desirable to restrict the access of the content of the debug file 110 to only authorized users.

Therefore, what is needed is a method and system that are capable of providing improved protections for the information content generated during a debug session, and address at least the problems set forth above.

SUMMARY OF THE INVENTION

In one embodiment, the present application describes a method for conducting a remote debug session from a debugger machine. The method comprises setting a secure connection link with a failed client machine, receiving status information from the client machine through the connection link in response to a debug instruction sent to the client machine, displaying the status information, requesting a user to enter a cryptographic key, and generating a secured file containing the status information encrypted with the cryptographic key.

In another embodiment, a computer debugging system is disclosed. The system comprises a display device, an input device, a memory, and a processing unit configured to set a secure connection link with a failed client machine at a remote location, receive status information from the client machine through the connection link in response to a debug instruction sent to the client machine, display the status information, request a user to enter a cryptographic key, and generate a secured file containing the status information encrypted with the cryptographic key.

At least one advantage of the method and system described herein is the ability to provide improved protection by restricting access of the content of debug files assembled during the debug session to only authorized users. As a result, sensitive information collected during the debug session is effectively protected at every stage of its handling, from the client machine to the debugger machine.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
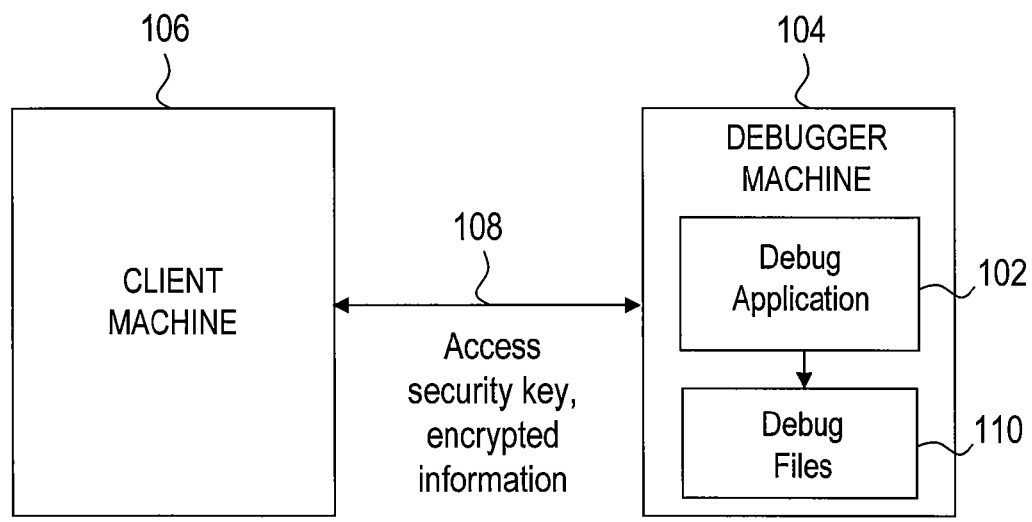
FIG. 1 is a simplified diagram of a conventional implementation for debugging a malfunctioning client machine.
Figure 2:
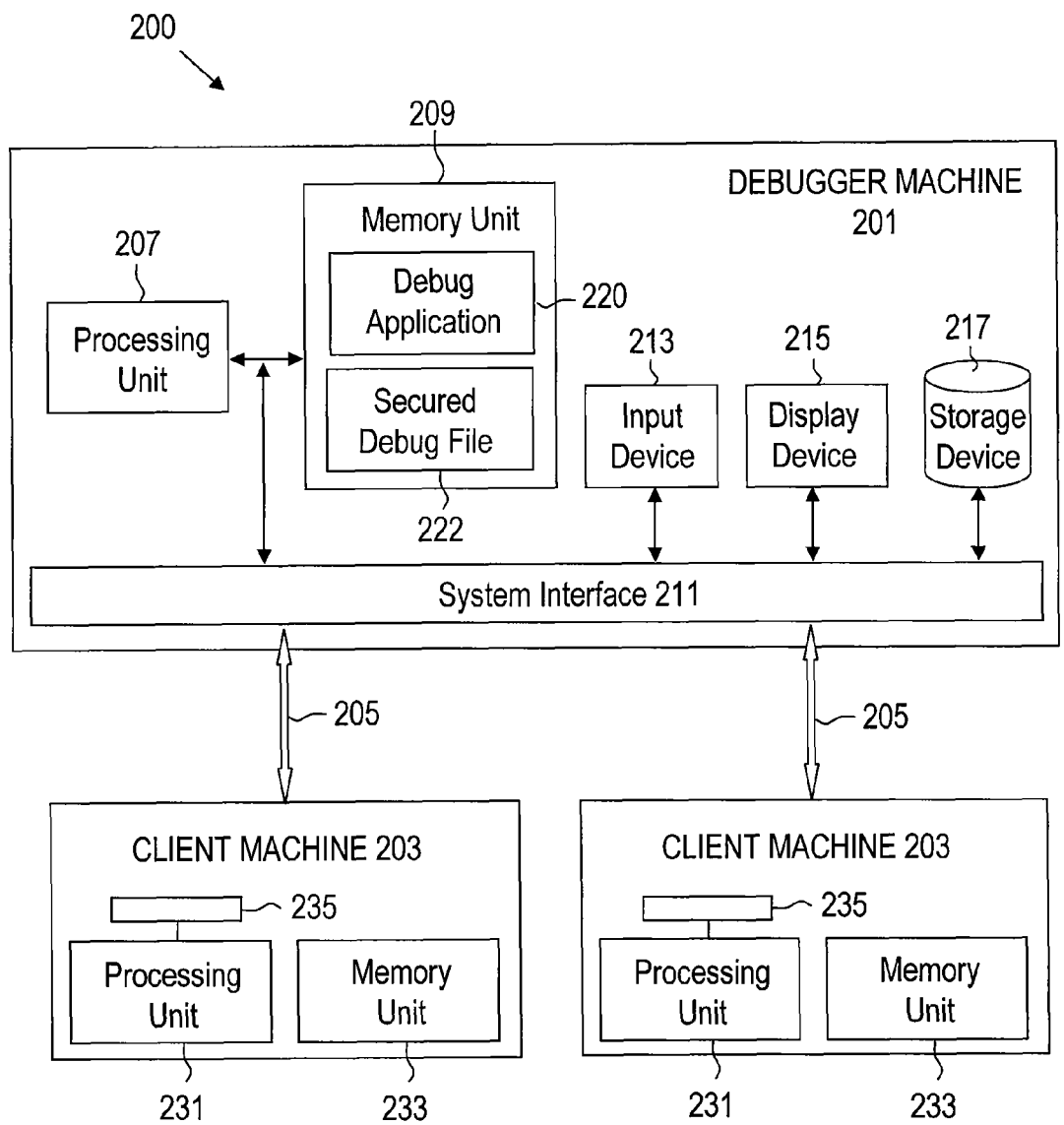
FIG. 2 is a schematic diagram of a debugging system implementing one or more aspects of the present invention.

FIG. 2 is a conceptual diagram of a debug system 200 suitable for debugging a client machine according to one or more aspects of the present invention. The debug system 200 includes a debugger machine 201 that is coupled to one or more client machine 203 through connection links 205. Each connection link 205 may include a direct test access interface, such as JTAG interface, or a network connection, such as a LAN/Internet connection. The debugger machine 201 includes a processing unit 207 coupled to a memory unit 209, a system interface 211, an input device 213, a display device 215 and a storage device 217. The memory 209 typically includes dynamic random access memory (DRAM) configured to connect to the processing unit 201. The processing unit 207 is adapted to execute programming codes of a debug application 220 loaded in the memory 209 to debug one or more client machine 203, and may communicate with the input device 213, the display device 215 and the storage device 217 through the system interface 211. The storage device 217 may include a hard disc drive, or any remote storage device.

The system interface 211 may include a system bus, a memory controller, universal serial bus, a LAN/Internet network interface, parallel port interface, JTAG interface, and other interfaces necessary to establish communication links between the processing unit 207 and the input device 213, display device 215, storage device 217, and client machine 203. More specifically, in one embodiment, the system interface 211 may be configured so that the debugger machine 201 can connect to multiple client machines 203 through JTAG and LAN connection links simultaneously. When the connection link 205 implements a JTAG interface, a USB-To-JTAG cable may further be used to connect to the corresponding client machine 203. Hence, multiple client machines 203 may be simultaneously connected and accessed by using a USB hub (not shown). The input device 213 may include a keyboard, a pointer mouse, and any devices enabling user's inputs during the execution of the debug application 220. The display device 215 is an output device capable of emitting a visual image corresponding to an input data signal. For example, the display device 215 may be built using a cathode ray tube (CRT) monitor, a liquid crystal display, or any other suitable display system. The system interface may include a system bus, a memory controller universal serial bus.

Each client machine 203 includes a processing unit 231 coupled to a memory unit 233. The processing unit 231 is coupled to an internal access controller 235 (such as an 8051-Series microcontroller) that enables bypassing the processing unit 231 to retrieve information related to internal register status of the processing unit 231. In response to debug commands issued by the debugger machine 201, status information related to register status of the processing unit 231 thus may be accessed via the controller 235, and returned from the client machine 203 to the debugger machine 201 via the connection link 205. The status information may include, without limitation, status of chip registers (not shown) used by the processing unit 231. The chip registers used by the processing unit 231 may be controllably accessed by using an Electronic Chip Identification (ECID) key inputted by the service engineer on the debugger machine 201. To ensure that networking transactions over the connection link 205 are secure, an Intelligent Platform Management Interface (IPMI) using a Remote Management Control Protocol (RMCP) may be implemented to transmit packets of information through the connection link 205. Suitable IPMI versions may include IPMI 2.0 using the RMCP+, which is an enhanced version of the RMCP protocol with security features. It is worth noting that the IPMI/RMCP allows the debugger machine 201 to conduct debugging operations on more than one client machine 203 at the same time. In addition, the debugger machine 201 may operate to debug each client machine 203 in different power states, such as a regular power-on state, low-power state, power-saving state, or even in a power-off state if necessary.

The debug application 220 formats the packets of information received via the connection link 205 into user readable content, which is temporarily stored in the memory 209 and visualized on the display device 215 for analysis. When the service engineer wants to save the displayed content, the debug application 220 requests a confidential key to assemble a secured debug file 222 that includes the result content of the debug session for the corresponding client machine 203. The content of the debug file 222 is thereby encrypted with the confidential cryptographic key inputted by the service engineer to restrict its access to only authorized users. While an embodiment of the invention uses a symmetric key encryption scheme, other encryption schemes may also be applicable. After the service engineer has entered a chosen confidential key, the secured debug file 222 is generated and then is saved in the storage device 217. When a user wants to open the secured debug file 222, he or she has to enter the correct key set by the service engineer to be able to correctly read the content of the debug file 222. In this manner, the content of the secured debug file 222 is accessible to only users authorized by the service engineer.

Figure 3A:
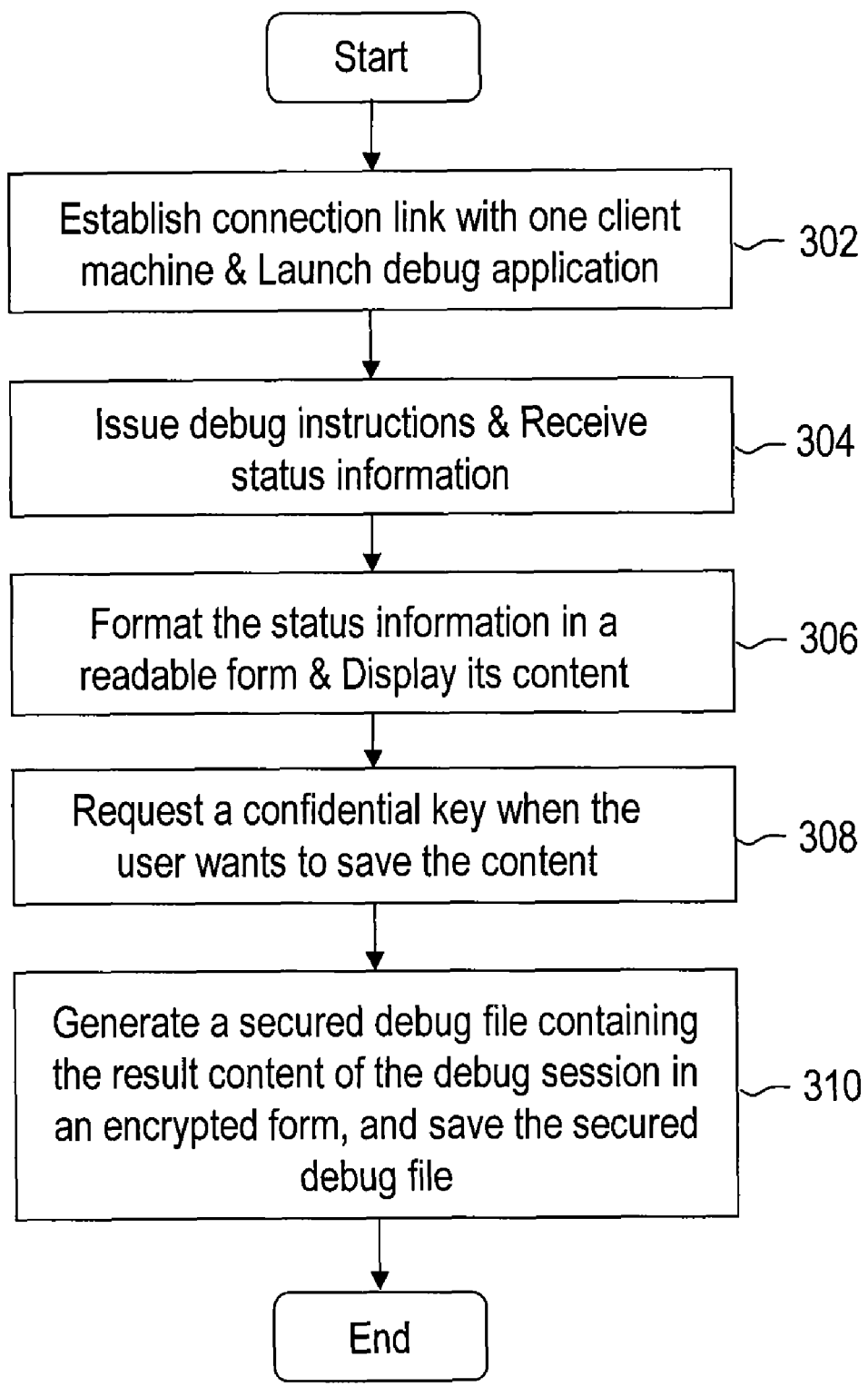
FIG. 3A is a flowchart of method steps performed in a remote debug session according to one embodiment of the present invention.

In conjunction with FIG. 2, FIG. 3A is a flowchart of method steps performed in a remote debug session according to one embodiment of the present invention. In initial step 302, to start the debug session, the connection link 205 is established between the debugger machine 201 and one client machine 203 and the debug application 220 is launched on the debugger machine 201. As the debug session proceeds in following step 304, the debug application 220 may issue debug instructions to the client machine 203, and status information may consequently be returned from the client machine 203 to the debugger machine 201 via the connection link 205. To ensure that secure transactions are performed through the connection link 205, various secure interface/protection implementations have been described above. In step 306, the debug application 220 formats the received status information into a readable form and displays its content on the display device 215 for analysis. In step 308, when the service engineer wants to save the displayed content, the debug application 220 requests the service engineer to enter a confidential key. Based on the inputted key, the debug application 220 in step 310 generates a secured debug file 222 that contains the result content of the debug session in an encrypted form, and then saves it in the storage device 217.

Figure 3B:
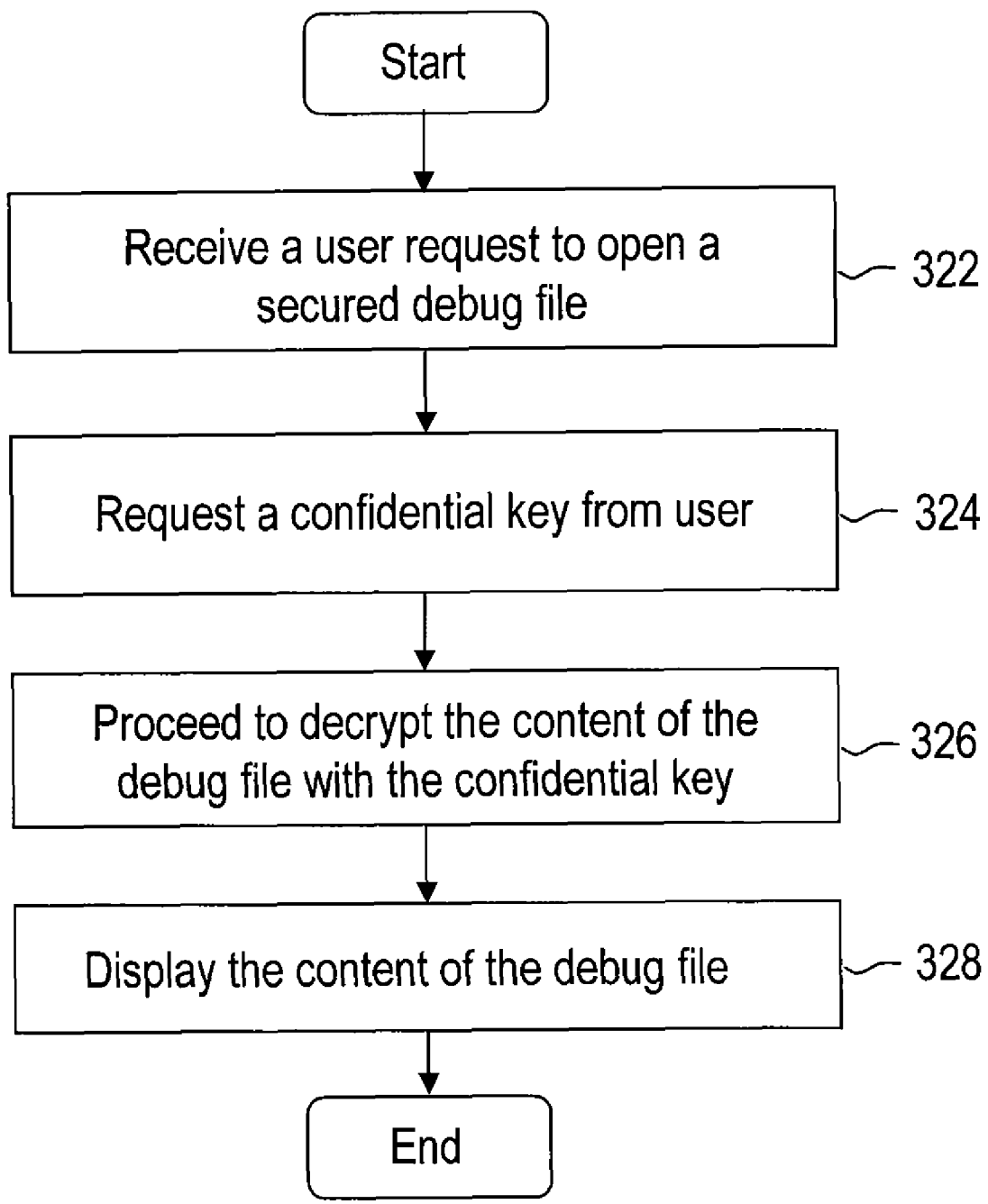
FIG. 3B is a flowchart of method steps for accessing the content of a secured debug file that has been generated during a debug session, according to one embodiment of the present invention.

In conjunction with FIG. 2 and FIG. 3A, FIG. 3B is a flowchart of method steps for accessing the content of a secured debug file 222 that has been generated during a debug session, according to one embodiment of the present invention. In step 322, the debug application 220 receives a user request to open a secured debug file 222. In response to the user request, the debug application 220 requests the user to enter the confidential key that was set by the service engineer when the debug file 222 was generated in a prior debug session. Based on the inputted key, the debug application 220 then proceeds to decrypt the content of the debug file 222 in step 326, and then display it on the display device 215 in step 328. If the inputted key is correct and corresponds to the one initially set by the service engineer, the encrypted content of the debug file 222 is restored and appears correctly in a readable form on the display device 215. Otherwise, the decryption of the debug file 222 will fail, and its content will appear encrypted on the display device 215.

As has been described above, the system and method for remotely debugging a client machine are thus able to provide improved protection by restricting access of the content of debug files assembled in the debugger machine to only authorized users. As a result, sensitive information collected during the debug session can be effectively protected at every stage of its handling, from the client machine to the debugger machine.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

I claim:

1. A method for conducting a remote debug session from a debugger machine, comprising:
    setting a secure connection link with a failed client machine;
    receiving status information from the client machine through the connection link in response to a debug instruction sent to the client machine, wherein the status information includes the status of internal chip registers in the client machine;
    displaying the status information in a readable form;
    requesting a user to enter a cryptographic key in response to a request for saving the status information; and
    generating a secured file containing the status information encrypted with the cryptographic key.

2. The method of claim 1, wherein setting a secure connection link includes setting a network connection.

3. The method of claim 2, wherein the network connection includes Local Area Network connection or an Internet connection.

4. The method of claim 2, wherein the secure connection link includes an Intelligent Platform Management Interface that implements a Remote Management Control Protocol.

5. The method of claim 1, wherein receiving status information from the client machine through the connection link includes entering an Electronic Chip Identification key to enable access to chip registers in the client machine.

6. The method of claim 1, further comprising:
    saving the secured file; and
    requesting a user to enter the cryptographic key again in response to a request for opening the secured file.

7. A computer debugging system, comprising:
    a display device;
    an input device;
    a memory; and
    a processing unit configured to
        set a secure connection link with a failed client machine at a remote location;
        receive status information from the client machine through the connection link in response to a debug instruction sent to the client machine, wherein the status information includes the status of internal chip registers in the client machine;
        display the status information in a readable form;
        request a user to enter a cryptographic key in response to a request for saving the status information; and
        generate a secured file containing the status information encrypted with the cryptographic key.

8. The system of claim 7, wherein the secure connection link includes a network connection.

9. The system of claim 8, wherein the network connection includes a Local Area Network connection or an Internet connection.

10. The system of claim 8, wherein the secure connection link includes an Intelligent Platform Management Interface that implements a Remote Management Control Protocol.

11. The system of claim 1, wherein the processing unit is further configured to
    save the secured file in a storage device; and
    request a user to enter the cryptographic key again in response to a request for opening the secured file.

* * * * *